Figure 1:
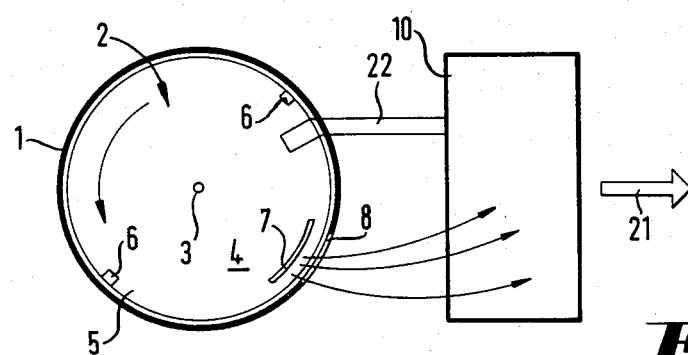

United States Patent [19]

Kela et al.

[11] Patent Number: 4,516,732
[45] Date of Patent: May 14, 1985

[54] METHOD AND APPARATUS FOR COMMINUTING STUMPS

[75] Inventors: Heino Kela, Ämmänsaari; Matti Läspä, Ullava, both of Finland

[73] Assignee: Kajaani Oy, Finland

[21] Appl. No.: 460,622

[22] Filed: Jan. 24, 1983

[30] Foreign Application Priority Data

Jan. 25, 1982 [FI] Finland .................................. 820227

[51] Int. Cl.³ ...................... B02C 18/08; B02C 19/12
[52] U.S. Cl. ........................................ 241/24; 241/28; 241/80; 241/224; 241/243
[58] Field of Search ................... 241/28, 101.7, 80, 97, 241/277, 152 A, 79.3, 79, 224, 242, 243, 248, 46.06, 46.02, 280, 282, 257 R, 24, 275

[56] References Cited

U.S. PATENT DOCUMENTS

| 453,486 | 6/1891 | Jones | 241/248 X |
| 3,519,052 | 7/1970 | Girgis | 241/257 R X |
| 3,578,250 | 5/1971 | Combs et al. | 241/46.02 |
| 3,736,967 | 6/1973 | Wood et al. | 241/277 X |

FOREIGN PATENT DOCUMENTS

758813 10/1956 United Kingdom ............ 241/257 R

*Primary Examiner*—Mark Rosenbaum

*Attorney, Agent, or Firm*—Andrus, Sceales, Starke & Sawall

[57] ABSTRACT

The invention is directed to a method and apparatus for comminuting stumps. The apparatus includes a generally cylindrical stationary drum having a feed opening in the upper portion through which stumps are fed to the drum. A rotatable substantially horizontal bottom encloses the lower end of the drum and is disposed to rotate about a vertical axis so that the stumps are forced to the outer periphery of the drum under centrifugal force and revolve along with the bottom. An abutment or counter member extending upwardly from the bottom and the stumps are braced against the countermember as they are moved into engagement with a generally cured vertically disposed blade that is spaced inwardly of the drum. The blade acts to comminute the stump and the chips or particles are discharged from the drum through a discharge opening which is disposed radially outward of the blade. The chips are fed into a cleaning drum and subsequently into a separating member where the rejected fraction of the chips is recirculated back to the drum. Detached soil can be removed from the feed drum through discharge peripheral apertures in the bottom, or through the gap between the cylindrical drum and the rotating bottom.

10 Claims, 5 Drawing Figures

METHOD AND APPARATUS FOR COMMINUTING STUMPS

The present invention concerns a procedure and means for comminuting stumps.

Stump gathering is carried out with special stump harvesters. The stumps are lifted from the soil with said harvesters, and they are transported with the harvester possibly in partly chopped condition and uncleaned to the factory for further treatment. In the factory treatment, the stumps are crushed, cleaned in a drum and by wet washing, and processed into chips for their ultimate use, such as digesting or burning as fuel.

In the procedure described, problems are caused by the comminuting. In particular the comminuting of stumps with a stump harvester constructed for stump lifting is slow work. Comminution is however necessary with a view to reaching higher efficiency in load space utilization during transport by lorry.

Considerable transport costs are further caused by the high amount of mineral soil carried along with the stumps to the factory, about 50% by weight. Moreover, the separation of such mineral soil from the stumps, at the factory, causes additional costs in the form of separation steps. The factory treatment of the stumps constitutes a complicated and expensive process.

The object of the present invention is to eliminate the drawbacks mentioned above. It is a further object of the invention: to provide a procedure and/or means for comminuting stumps wherein the drawbacks mentioned are not observed. In particular, the object of the invention is to provide a procedure and/or means which is appropriate for the comminuting of stumps and for separating soils from the stumps already in the forest in such manner that the stumps may be transported to the factory in ready-comminuted condition and substantially more free from loose soil than before. It is a further object of the invention to provide a procedure and/or means for comminuting stumps which is suitable to be applied both upon the chassis of a working machine, such as a forest tractor, or if desired in conjunction with a stationary production unit.

Reference is made to the claims regarding the characteristic features of the invention.

The invention is based on the stumps being comminuted upon the rotating horizontal bottom of a substantially vertical, cylindrical and essentially stationary cylinder with the aid of counter-members on the outer margin of the bottom. Cutting takes place as the stumps hit against a stationary blade, which has been affixed to the inner shell of the cylinder. The stump going to be cut tends to go to the outer periphery of the bottom owing to centrifugal force. The counter-members of the rotating bottom have been disposed to pass preferably through between the blade and the side wall of the cylinder. The comminuted stump pieces depart preferably tangentially from the feed drum through an aperture adjacent to the blade.

It is particularly advantageous in the procedure that when using the procedure and/or means of the invention the sand, stones or other soil types adhering to the stump are detached from the stump as the stump owing to centrifugal force hits against the side wall of the driven feed drum or against the counter-members. Furthermore, even further soil types are detached from the stump as the stump hits against the blade. The detached soil types depart from the feed drum along with the stump pieces through the discharge aperture and/or through apertures provided in the side walls of the drum or alternatively on the outer margin of the bottom disk, possibly in under the bottom and from here further, flung by vanes affixed to the underside of the rotating bottom, out along a channel on the side wall.

The sand is thus sorted by centrifugal action to the outer periphery of the feed drum and the stump pieces are cleaned in continuous action during the process. It is possible, if desired, to use screens or e.g. screening drums towards cleaning the stump pieces scrupulously of sand and loose soils.

The procedure of the invention is eminently suitable for use in conjunction with movable forest machines. The apparatus may be installed for instance on the chassis of a forest tractor.

Figure 2:
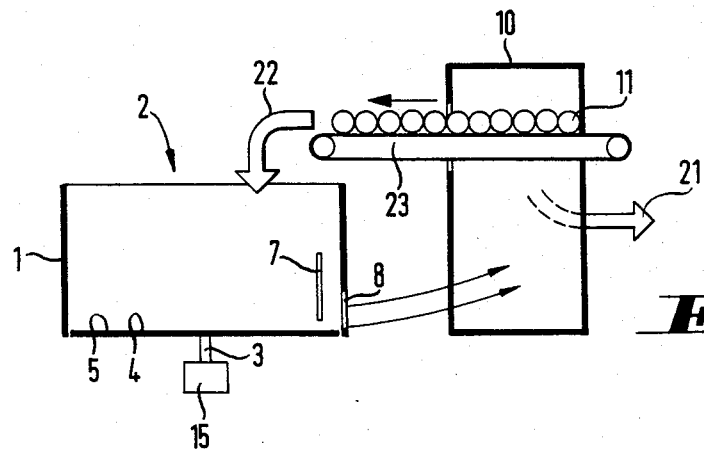

The invention is described in detail in the following with the aid of embodiment examples, reference being made to the attached drawings, wherein:

FIGS. 1-2 present, in a schematical diagram, the implementation of the procedure of the invention and the apparatus of the invention, in top view, respectively in elevational view.

Figure 3:
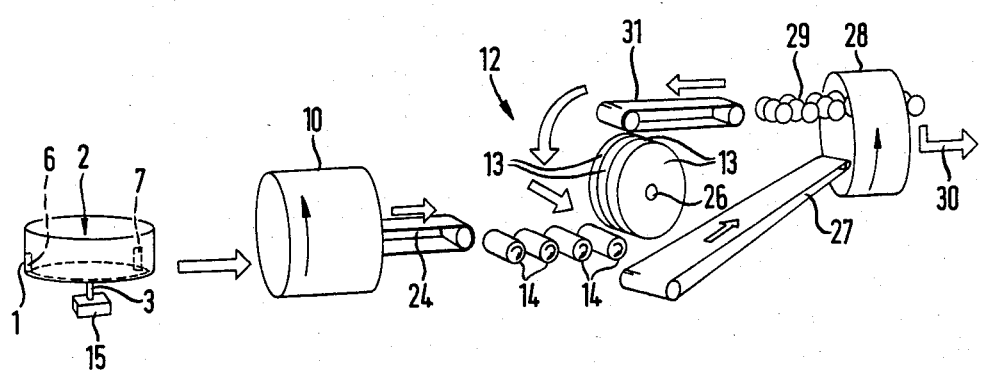
Figure 4:
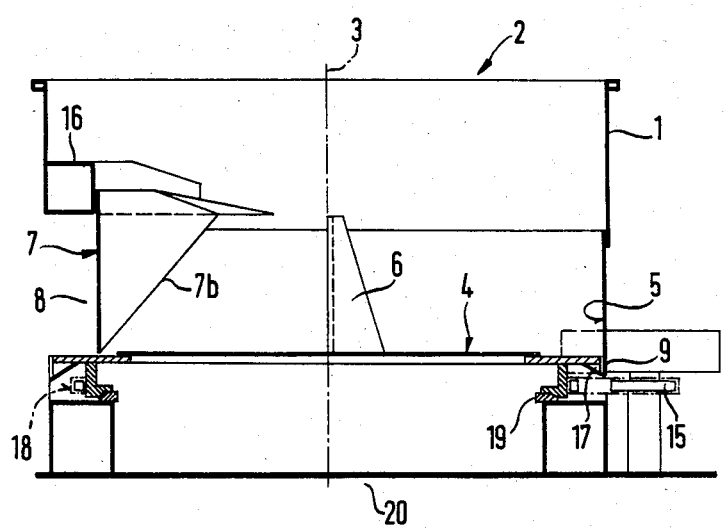
Figure 5:
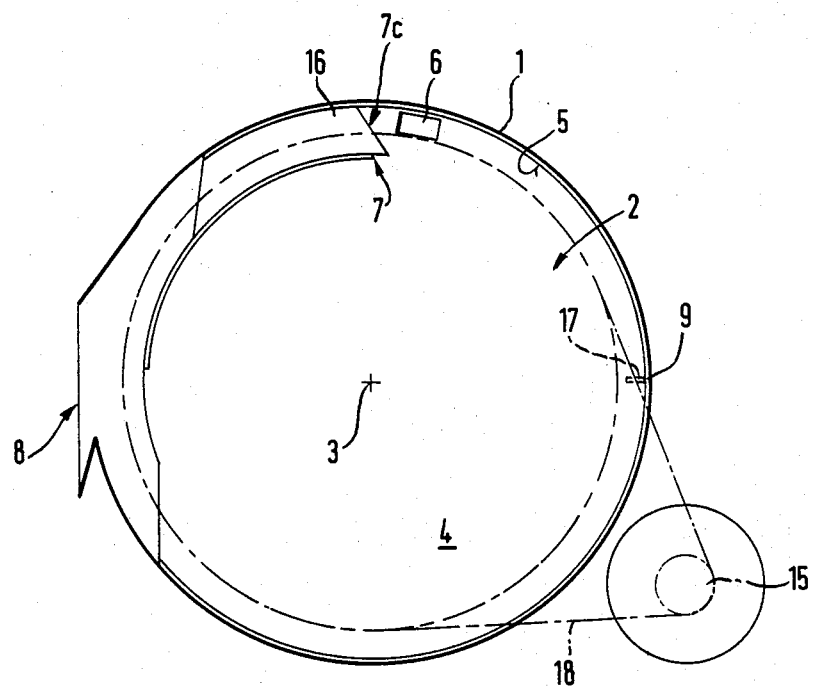

FIG. 3 presents the procedure and apparatus according to another embodiment of the invention, in the form of a block diagram, FIG. 4 shows in a schematic diagram and in detail the means of FIGS. 1-2, with the cleaning drum and screen removed, and FIG. 5 shows the same means as FIG. 4, in top view.

In FIGS. 1-2 is seen a substantially vertical, essentially stationary and cylindrical feed drum 1, its top end 1 constituting the feed aperture 2, and a concentric drum bottom 4 which can be made to rotate about a vertical axis of rotation 3 by the aid of a power means 15. The bottom 4 has been provided with two upwardly projecting counter-members 6, and the drum 1 has been fitted with a centric blade 7 carried on the drum and parallelling the vertical cylindrical wall of the drum. The said components have been so arranged that a stump that is dropped upon the rotating bottom 4 finds its way, due to centrifugal force, to the outer periphery 5 of the bottom 4 and begins to revolve along with the bottom, bracing itself against the counter-member 6, and is cut to pieces when it hits against the blade 7, urged by the counter-member. In the side wall of the cylindrical feed drum 1 has been provided an aperture 8 adjacent to the blade 7 and therebehind, so that the pieces formed of the stump will depart through the aperture tangentially outward through said discharge opening 8.

A stump fed into the feed drum strikes owing to centrifugal force with high force against the side walls of the drum, whereat part of the stones, sand and other loose soils which cling to the stump are detached. When the stump hits against the blade 7, more soil types adhering to the stump are detached therefrom. Thus, the detaching of stones, sand and other loose soils from the stumps takes place most efficiently and completely. The detached soil matter may be removed from the feed drum through discharge apertures provided in its side walls, through discharge apertures provided in the bottom, through the gap between the side walls and bottom and/or along with the pieces of the stump.

In the embodiment depicted in FIGS. 1-2, the comminuted stumps have been conducted from the feed drum 1 into a cleaning drum 10 rotating about a horizontal axis, hence onto disk sieves 11, whereafter the fraction 21 passing the sieve has been conducted to a product storage and the reject fraction 22, on a belt conveyor 3 to the feed drum 1 again.

In the flow diagram presented in FIG. 3, the stumps are lifted by a loader into the feed drum 1, where they form pieces as described in the foregoing, as they hit against the blade 7. Through an aperture opening tangentially from the feed drum 1, the stump pieces are directed into the cleaning drum 10, where the loose soil types are detached. From the cleaning drum 10, the stump pieces go, carried by the conveyor 24, to a particular disk cutter 12, where the stump pieces are directed by the aid of feed rolls 14 against substantially parallel blade disks 13 rotating freely about a common axis 26 and being axially substantially uniformly spaced, whereby the stump pieces are crushed as the stumps are pressed against the blade disks by the rolls, driven by a power means. The stump pieces produced in the disk cutter 12 are conducted with the aid of a conveyor 27 into a cleaning drum 28, which lifts the stump pieces onto a disk sieve 29. The accept fraction 30 passing through the disk sieve 29 is conducted to outdoor storage; oversize stump pieces go over the disk sieve, back via the conveyor 31 of the disk cutter.

In the application depicted in FIG. 4 is seen a means as in FIG. 1 for stump comminuting, in elevational view; FIG. 2 shows the same means in top view. The means comprises a vertical, substantially stationary and cylindrical feed drum 1, its upwardly pointing open top end constituting the feed aperture 2. The bottom 4 of the feed drum 1 consists of a disk-like bottom plate concentric with the feed drum and rotating about a vertical axis of rotation 3, the stumps to be comminuted being dropped onto this bottom plate. The bottom 4 is provided with at least one counter-member 6 pushing upwards from the surface of the bottom and placed in the vicinity of the bottom's lateral edge. Furthermore, on the inner surface of the drum has been fixed with the aid of a fixing body 16, a blade 7 in such manner that the blade is curved and concentric with the axis of rotation 3 of the bottom 4, constituting a blade edge which curves in the direction of rotation of the bottom obliquely downward in the trailing direction. Between the blade 7 and the side wall of the feed drum 1 a narrow passage is formed, through which the counter-member 6 has been disposed to pass as it is driven round with the bottom plate as the latter rotates.

The bottom 4 has been furnished with a power means 15, such as a hydraulic or electric motor, arranged to rotate the bottom e.g. over a V-belt 18. The bottom is carried on the frame 20, rotatably with the aid of bearings 19. The side wall of the drum 1 forms, below the bottom 4, an upwardly turning border, or channel, into which the fine material ending up on the bottom will run through the gap between the lateral edge of the bottom and the side wall of the drum. On the underside of the bottom have been formed radial vanes 17 entering the said channel, and these vanes fling out the material that has accumulated in the channel, through apertures 9 made in the side walls of the drum.

The blade 7 is preferably adjustable in desired position with reference to the side wall of the drum radially with reference to the drum, so that the size of the stump pieces produced in the drum can be adjusted by shifting the position of the blade.

The means depicted in FIGS. 1-5 are mainly intended to be mounted on a forest tractor chassis. If desired, the means may also be stationarily mounted e.g. in a factory plant.

The blade 7 is preferably bipartite. It may then constitute a substantially vertical cutting blade 7a parallelling the side wall of the feed drum 1, of which the cutting edge 7b may in its upper part be inclined in the direction opposite to the direction of rotation of the bottom 4, and a substantially horizontal cutting blade 7c which connects the vertical cutting blade to the side wall of the feed drum.

The embodiment examples are meant to illustrate the invention, without in any way restricting it.

We claim:

1. A method of comminuting stumps, comprising the steps of feeding stumps into the upper end portion of a fixed generally cylindrical drum having a rotatable bottom surface, rotating said bottom surface to throw the stumps outwardly by centrifugal force against the drum, engaging the stumps with an abutment located on the peripheral edge of said bottom surface, moving the rotating stump into contact with a fixed generally curved blade disposed concentrically of said drum and located radially inward of said drum to comminute the stump to form comminuted particles, and discharging the comminuted particles in a generally horizontal plane tangentially through a discharge opening in the drum.

2. The method of claim 1, and including the step of discharging foreign material associated with said stump through an opening located at the periphery of said bottom surface.

3. A method of claim 1, and including the steps of feeding the comminuted particles from said drum to a cleaning drum, and thereafter delivering the particles from said cleaning drum to a separating member to separate large sized particles from smaller sized particles, and recirculating the larger sized particles back to the drum.

4. An apparatus for comminuting stumps, comprising a stationary drum having a cylindrical wall and having a feed opening in the upper portion thereof through which stumps are introduced into the drum, a substantially horizontal bottom enclosing the lower end of the drum, said bottom having a peripheral edge, means for rotating the bottom about a vertical axis so that stumps introduced into the drum will be forced toward the cylindrical wall of the drum under centrifugal force, a counter member extending upwardly from said bottom and spaced inwardly of said wall, and a generally curved blade attached to the drum and spaced vertically above said bottom, said blade being disposed concentrically of said wall and spaced radially inward of said wall, said blade having a cutting edge facing opposite to the direction of rotation of said bottom whereby stumps being braced against the counter member are brought into engagement with said cutting edge to comminute the stump into particles, said wall having an outlet extending upwardly from said bottom and disposed radially outward of said base to discharge the comminuted stump particles.

5. The apparatus of claim 4, characterized in that the radial spacing between said blade and said wall is greater than the radial dimension of said counter member so tha the counter member on rotation of said bottom can pass between said blade and the wall.

6. The apparatus of claim 4, characterized in that the outlet is spaced circumferentially of said cutting edge in the direction of rotation of said bottom whereby the comminuted particles will be thrown tangentially through said opening.

7. The apparatus of claim 4, characterized in that the peripheral edge of said bottom is spaced from the wall to provide an annular gap, foreign particles associated with said stump being discharged through said gap.

8. The apparatus of claim 4, characterized in that said bottom is provided with at least one discharge aperture adjacent the peripheral edge, foreign materials associated with said stump being discharged through said aperture.

9. The apparatus of claim 4, and further characterized in a cleaning drum disposed to receive said comminuted particles discharged from said drum.

10. The apparatus of claim 9, and further characterized in separating means to receive the comminuted particles and arranged to separate smaller comminuted particles from larger particles, and means for recirculating the larger particles back to said drum.

* * * * *